United States Patent
Li et al.

(10) Patent No.: US 8,331,206 B1
(45) Date of Patent: *Dec. 11, 2012

(54) CALIBRATION BASED DC COUPLED ANALOG FRONT END FOR OPTICAL STORAGE SYSTEM

(75) Inventors: Yingxuan Li, Saratoga, CA (US); Fu-Tai An, San Jose, CA (US); Yonghua Song, Cupertino, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,733

(22) Filed: Dec. 20, 2010

Related U.S. Application Data

(63) Continuation of application No. 11/755,463, filed on May 30, 2007, now Pat. No. 7,869,312.

(60) Provisional application No. 60/811,555, filed on Jun. 7, 2006.

(51) Int. Cl.
*G11B 7/00* (2006.01)

(52) U.S. Cl. ........... 369/44.11; 369/47.2; 369/47.35; 369/59.27; 369/102; 369/124.09

(58) Field of Classification Search ............ None
See application file for complete search history.

(56) References Cited

U.S. PATENT DOCUMENTS

| | | | |
|---|---|---|---|
| 5,650,987 A | 7/1997 | Kadowaki | |
| 7,425,849 B2 * | 9/2008 | Gupta et al. | 327/112 |
| 7,869,312 B1 * | 1/2011 | Li et al. | 369/44.11 |
| 2003/0179664 A1 | 9/2003 | Tanase et al. | |
| 2004/0228220 A1 | 11/2004 | Horne | |
| 2005/0036410 A1 | 2/2005 | Chang | |
| 2005/0141666 A1 * | 6/2005 | Cole et al. | 377/115 |
| 2005/0219971 A1 | 10/2005 | Shih et al. | |
| 2006/0132339 A1 * | 6/2006 | Alon et al. | 341/120 |
| 2006/0280054 A1 | 12/2006 | Yang et al. | |
| 2007/0091744 A1 | 4/2007 | Li et al. | |
| 2007/0139539 A1 * | 6/2007 | Ohara et al. | 348/243 |
| 2007/0280066 A1 | 12/2007 | Liao et al. | |

\* cited by examiner

*Primary Examiner* — Joseph Haley
*Assistant Examiner* — Ifedayo Iluyomade

(57) ABSTRACT

In an apparatus for conditioning a signal from an optical pickup unit (OPU), a single-ended channel includes a first signal processing block to calibrate a dark level of a single-ended signal corresponding to a single-ended output of the OPU, if any, and to center the single-ended signal. A dual-ended channel includes a second signal processing block to calibrate a dark level of a dual-ended signal corresponding to a dual-ended output of the OPU, if any, and to center the dual-ended signal. A multiplexer selects one of the single-ended channel and the dual-ended channel, and outputs a selected signal. A digital signal processing stage converts the selected signal to a digital signal.

20 Claims, 10 Drawing Sheets

CALIBRATION BASED DC COUPLED ANALOG FRONT END FOR OPTICAL STORAGE SYSTEM

CROSS-REFERENCE TO RELATED APPLICATIONS

This application is a continuation of U.S. application Ser. No. 11/755,463, filed on May 30, 2007, which claims priority under 35 U.S.C. §119(e) to U.S. Provisional Application No. 60/811,555, filed on Jun. 7, 2006. The disclosures of the applications referenced above are incorporated herein by reference.

BACKGROUND

In an optical storage system, an optical pick-up unit (OPU) sends signals to an analog front end (AFE) or driver circuit. The AFE receives and processes the signals. Some of the signals from the OPU are differential signals and some of the signals are single ended signals. There are also two types of signaling methods, one uses a voltage mode and the other uses a current mode. When a laser in the OPU is off, the signal level is DC and is referred to as the dark level. For voltage mode signaling, the dark level is the reference voltage of the OPU and is normally set by the driver chip. For current mode signaling, when the laser is off, the current is zero, so the voltage is the termination voltage of the terminating resistor. The termination voltage is also set by the AFE. The dark level determines the DC level for the single ended signals as well as the common modes for the differential signals. The dark levels of OPU vary from one type of OPU to another type of OPU. For example, dark level may vary from 1.4v to 2.5v depending on the product and application. The signal amplitudes can also vary from one type of OPU to another type of OPU, from read to write and from one media type to another media type. Signal amplitude can be as small as tens of millivolts during read and as large as several volts during write.

A prior art driver chip was not able to adapt to the variety of operating conditions and OPU configurations. Further, analog circuitry of the AFE conventionally have a limited common range and limited signal dynamic range for achieving low cost and high performance design. Accounting for DC shifting and signal scaling can be accomplished by AC coupling or a DC level shift circuit. However, an AC coupling approach has an intrinsic performance drawback of data-dependent base line wandering. AC coupling also needs capacitors on board or on chip, which add cost. Most of the signals from the OPU carry low frequency servo information. Because AC coupling blocks out the low frequency component, it cannot be used to shift the DC for those signals carrying low frequency servo information.

SUMMARY

In one embodiment, an apparatus for conditioning a signal from an optical pickup unit (OPU) comprises a single-ended channel including a first signal processing block to calibrate a dark level of a single-ended signal corresponding to a single-ended output of the OPU, if any, and to center the single-ended signal. The apparatus also comprises a dual-ended channel including a second signal processing block to calibrate a dark level of a dual-ended signal corresponding to a dual-ended output of the OPU, if any, and to center the dual-ended signal. Additionally, the apparatus comprises a multiplexer to select one of the single-ended channel and the dual-ended channel and to output a selected signal. Further, the apparatus comprises a digital signal processing stage to convert the selected signal to a digital signal.

In another embodiment, a method is for processing a data signal from an OPU using a signal conditioning unit comprising a single-ended channel and a dual-ended channel. The method includes selecting one of the single-ended channel and the dual-ended channel as an active channel, and calibrating a dark level of the active channel. The method additionally includes centering the data signal in the active channel within a dynamic range of a digital signal processing stage, and converting the data signal of the active channel to a digital signal at the digital signal processing stage.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1A:
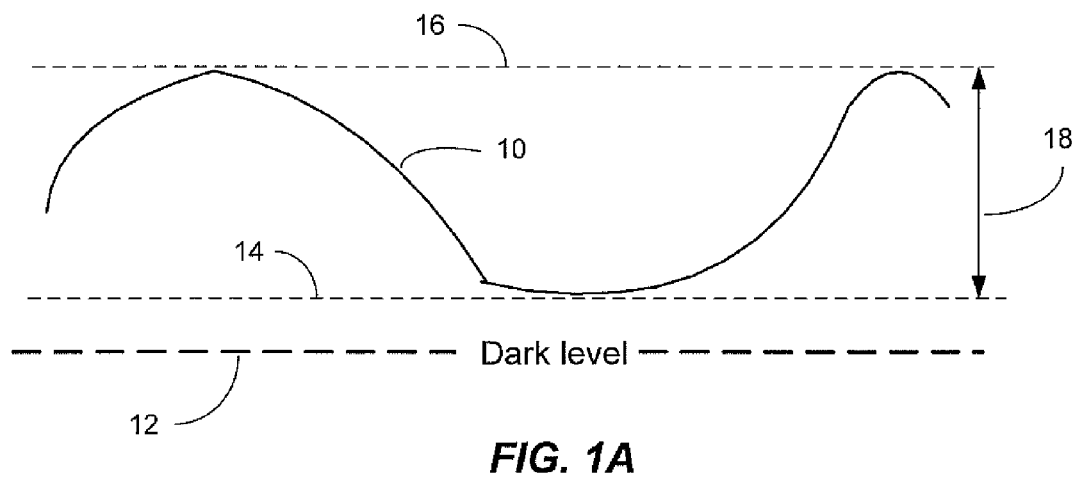
FIG. 1A illustrates an single-ended input signal.
Figure 1B:
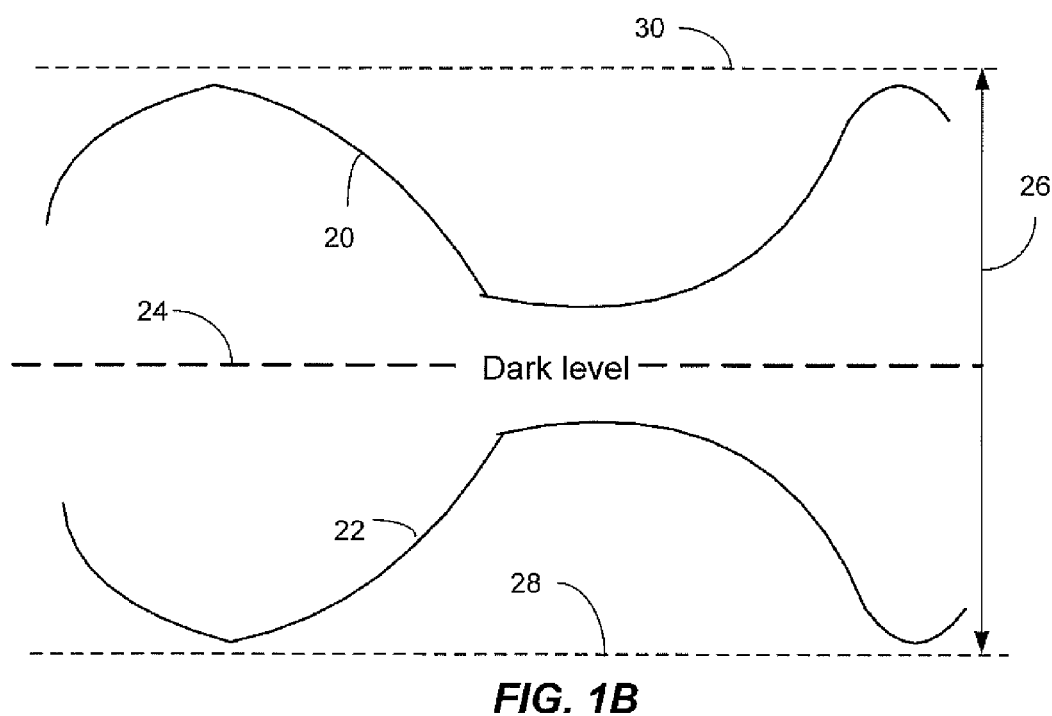
FIG. 1B illustrates a differential input signal.

FIG. 1A illustrates an exemplary single-ended signal 10 that swings above a dark level 12 that corresponds to the reference voltage of the OPU when the laser of the OPU is off. For some OPU configurations, the AFE supplies the reference voltage to the OPU. The dynamic range of the signal is represented by low reference 14 and high reference 16 and is signified by a range 18. FIG. 1B illustrates positive 20 and negative 22 signals that swing on both sides of a dark level 24. The dynamic range 26 of the differential signals 20, 22 ranges from a low level 28 to a high level 30.

Figure 2:
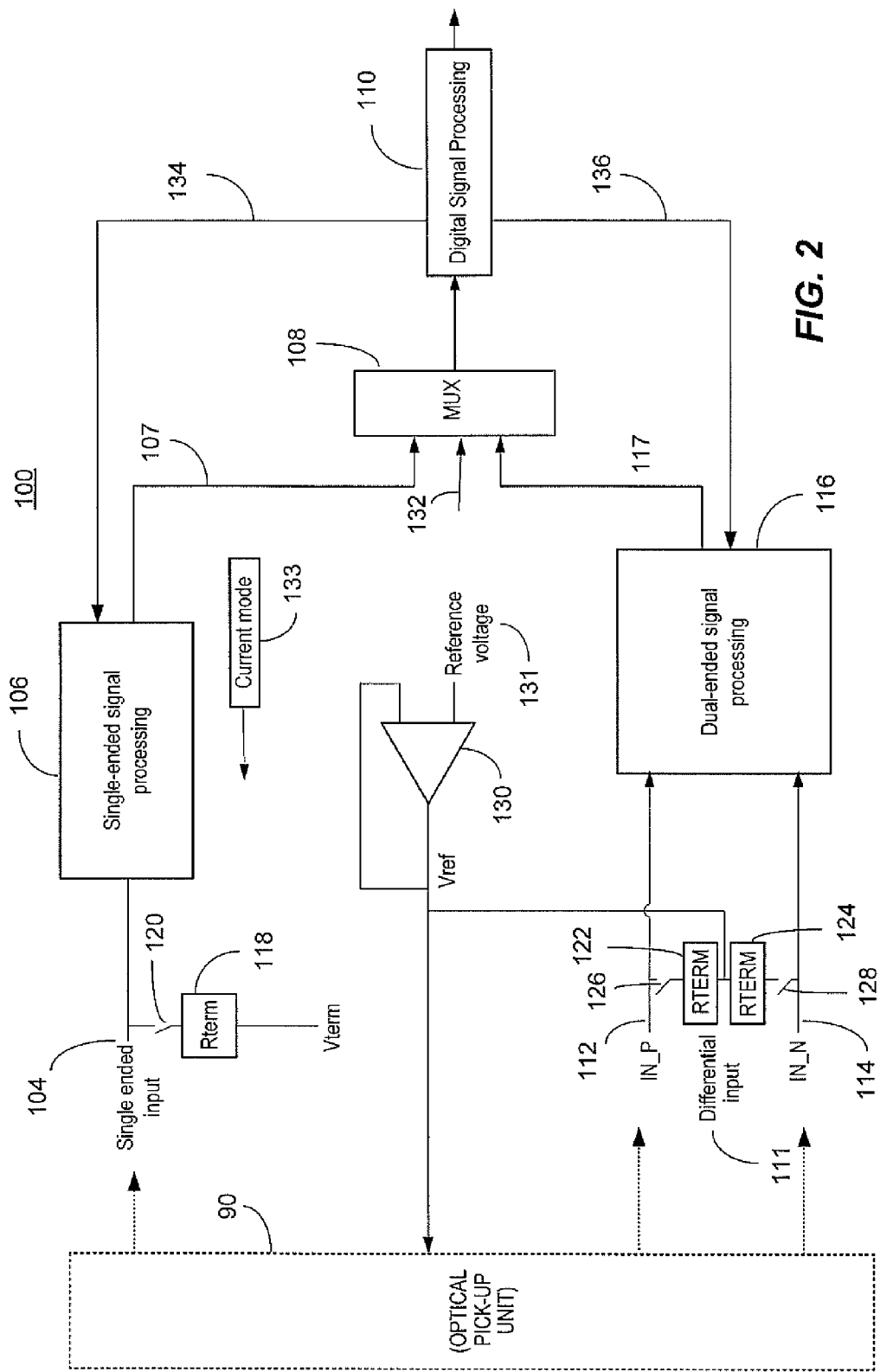
FIG. 2 is a block diagram of an analog front end (AFE) for an optical pickup unit (OPU).

FIG. 2 is a block diagram of an analog front end (AFE) 100 for an optical pickup unit (OPU). The OPU 90 is shown in dashed lines, indicating it is not part of the AFE 100. A single-ended input 104 is coupled to a single-ended signal processing block 106. An output signal 107 from the single-ended signal processing block 106 is coupled to multiplexer 108, which is used to couple the output signal 107 to a digital signal processing block 110. The single-ended input 104 is selectively coupled to a terminating resistor 118 by switch 120. When the switch 120 is open, the single-ended input 104 is operable as a voltage input. When the switch 120 is closed, the single-ended input 104 is operable as a current input. Vterm is shown in FIG. 2 as being the reference voltage for the terminating resistor 118. Vterm may be Vss or a reference voltage. The switch 120 may be controlled via a current mode selection signal 133.

A differential, or dual-ended, input 111 has a positive input 112 and a negative input 114, each coupled to respective inputs on a dual-ended signal processing block 116. An output 117 of the dual-ended signal processing block 116 is coupled to the multiplexer 108. The selection between output 107 and output 117 is made by signal 132. Selection between voltage and current input modes for the differential input 111 is made by activating switches 126 and 128 to connect respective terminating resistors 122 and 124. The switches 126 and 128 may be controlled via the current mode selection signal 133. In this exemplary embodiment, the current mode terminating resistors 122 and 124 are referenced to Vref, supplied by operational amplifier (op-amp) 130. Vref may also be utilized as a dark level reference voltage for the OPU 90.

In operation, a reference voltage 131 is supplied to operational amplifier 130. The reference voltage 131 may be set according to specifications for the OPU 90 in use. A signal may be applied to multiplexer control 132 to select between single input 104 and differential input 111. Again, according to OPU specifications, the current mode selection signal 133 may be set to connect or disconnect the terminating resistor 118 for the single-ended input 104 and terminating resistors 122 and 124 for the differential input 111.

Initial calibration of the selected channel (single or differential) may be accomplished by turning a laser (not depicted) of the OPU 90 off. The resulting output signal from the OPU will, depending on the particular OPU, be set to Vref. Calibration of the DC level can be made at this time, as will be discussed in more detail below. Next a calibration signal may be generated by the OPU, either using a special mode or by playing a known media. In the calibration mode, the signal at the selected input can be propagated through the selected signal processing block (either single-ended signal processing block 106 or dual-ended signal processing block 116) to the digital signal processing stage 110. Feedback signals 134 and 136 can be used to adjust the attenuation, gain, and DC level adjustments in the signal processing block of the selected channel to center the signal and adjust it to fit the dynamic range of the digital signal processing block 110.

Figure 3:
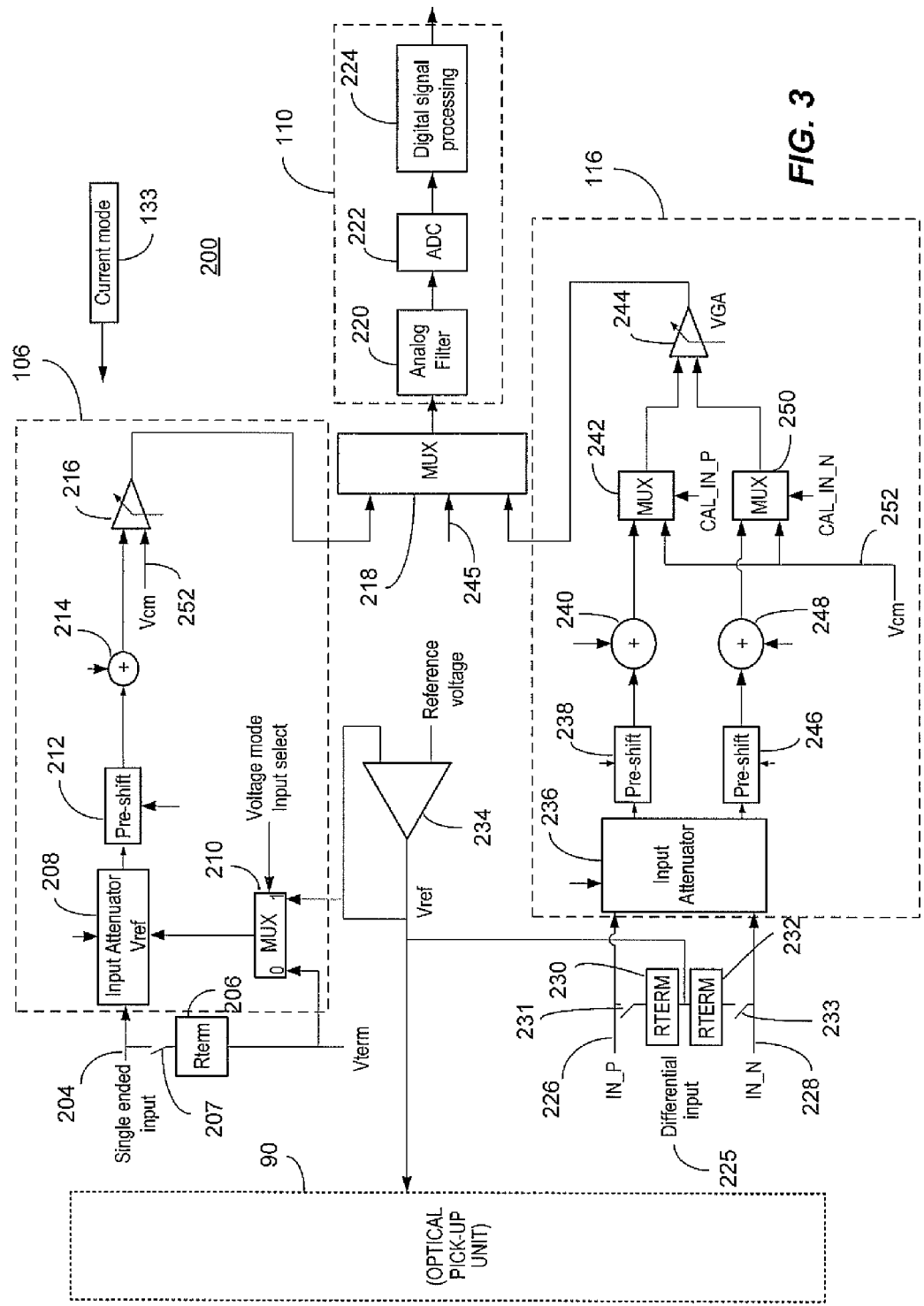
FIG. 3 is a more detailed block diagram of the AFE of FIG. 2.

FIG. 3 illustrates a more detailed view of the circuit of FIG. 2, showing one embodiment of the single and dual-ended signal processing blocks 106 and 116, as well as digital signal processing stage 110, of FIG. 2. The OPU 90 is shown for reference and is not considered part of the AFE 200 of FIG. 3.

The single-ended input channel begins at a single-ended input 204. A terminating resistor 206 used for current mode operation is connected using switch 207. An input attenuator 208 is coupled to the input 204. A multiplexer 210 selects the reference of the attenuator 208 corresponding to the current mode/voltage mode selection. In the current mode, when switch 207 is closed responsive to signal 133, the input attenuator 208 is referenced to Vterm. When in the voltage mode, the attenuator is referenced to Vref.

Figure 4:
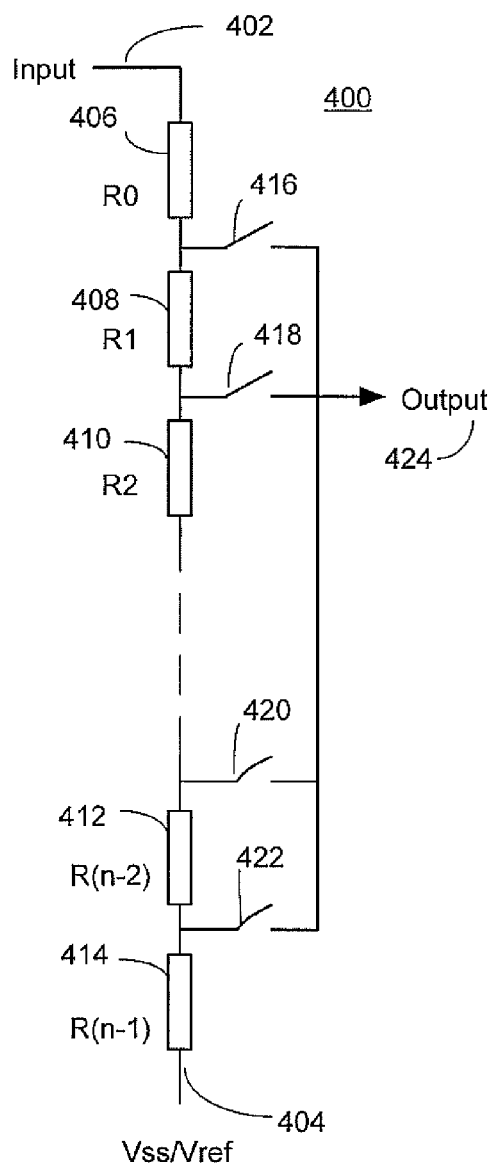
FIG. 4 is a block diagram of a single-ended attenuator.

Turning briefly to FIG. 4, one embodiment of an input attenuator 400, the same as or similar to the input attenuator 208 of FIG. 2 is shown. The input 402 and reference termination 404 are coupled through a set of serially connected resistors 406, 408, 410, 412, 414. The reference termination may be selectively couple to Vss (in most cases circuit ground) or Vref as described above. The set of serially connected resistors may be as long as required by the design and design constraints. Each resistor is coupled via switches 416, 418, 420, 422, to output 424. By selectively closing switches 416-422, varying levels of attenuation may be applied to a signal at the input 402, or in this example, input 204 of FIG. 2.

Returning to FIG. 3, after attenuation, a signal may pass to a pre-shifter 212 for adjusting a DC level of the signal. A second level shifter 214 may be used to calibrate the DC level. When the single-ended input is to be converted to a differential signal, the signal may be referenced to a common mode reference Vcm 252. With or without common mode referencing, an adjustable gain stage 216 may be used to vary the amplitude of the signal to fit the dynamic range of the digital signal processing stage 110. Following the multiplexer 218, controlled by channel selection signal 245, the digital signal processing stage 110 may include an analog filter 220, an analog-to-digital converter (ADC) 222 and digital signal processor (DSP) 224.

Similar to the differential input 111 of FIG. 2, differential input 225 may include positive and negative inputs 226 and 228 respectively. Switches 231 and 233 may be used to connect or disconnect terminating resistors 230 and 232, responsive to signal 133. The terminating resistors 230 232 may be referenced to Vref, when in the current mode. An input attenuator 236 has dual inputs that may be coupled to the positive and negative inputs 226 228 respectively.

Figure 5:
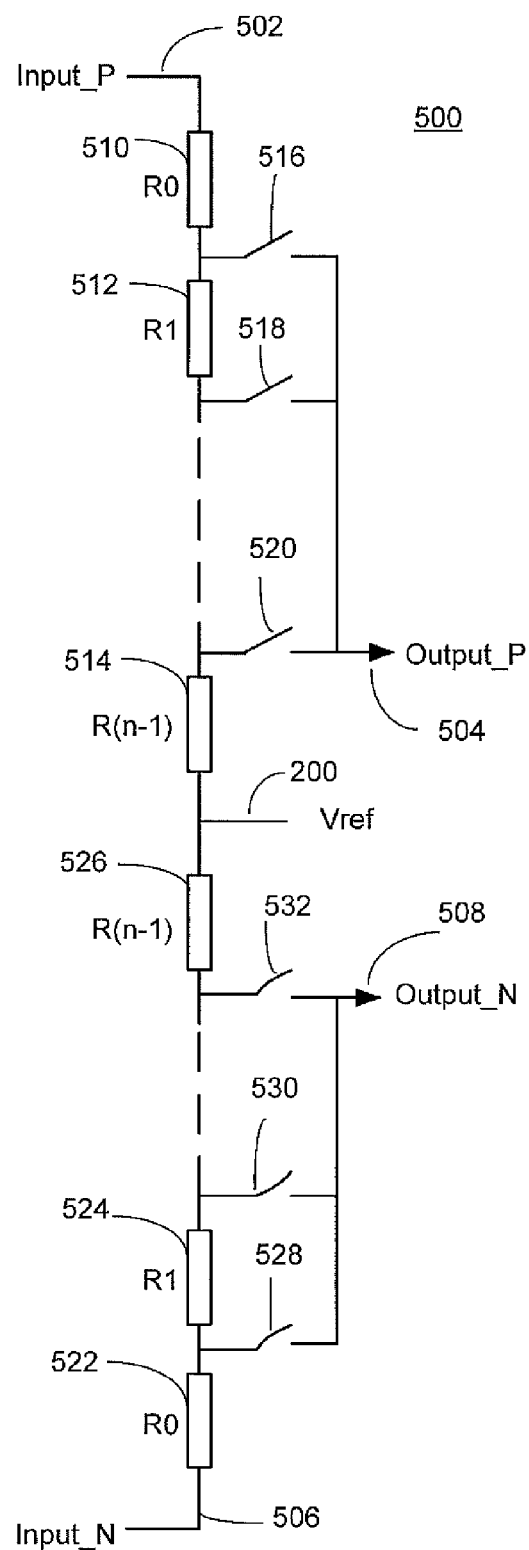
FIG. 5 is a block diagram of a dual-ended attenuator.

Turning briefly to FIG. 5, one embodiment of a dual-ended input attenuator 500, the same as or similar to the dual-ended attenuator 236 of FIG. 3 is described. The dual-ended attenuator 500 has a positive input 502 coupled to positive output 504 through a series of resistors 510, 512, etc. through corresponding selectable switches 516, 518, and 520. A mirror structure at the negative input 506 couples resistors 522, 524, etc. to output 508 through selectable switches 528, 530 and 532. Matched resistors 514 and 526 connect the positive and negative branches to the differential reference, in this example, Vref.

Returning to FIG. 3, similar to the single-ended inputs, the signals from the output of the attenuator 236 are DC shifted using pre-shifter circuits 238 and 246 and further shifted by a second level shifter in each channel 240 and 248. In one embodiment, the pre-shifters 238 and 246 are used for dynamic changes during operation and level shifters 240 and 248 are used for one-time calibrations. A positive and negative multiplexer 242 and 250 respectively are used during calibration to selectively connect either the positive or negative channel to a common mode voltage 252 during calibration. Each multiplexer 242 250 may be individually controlled during the calibration cycle, as discussed in more detail below. A gain stage 244 may be used to adjust the signal amplitude to fit the dynamic range of the digital signal processing stage 110. Calibration and operation of the circuit is discussed in more detail below.

Figure 3A:
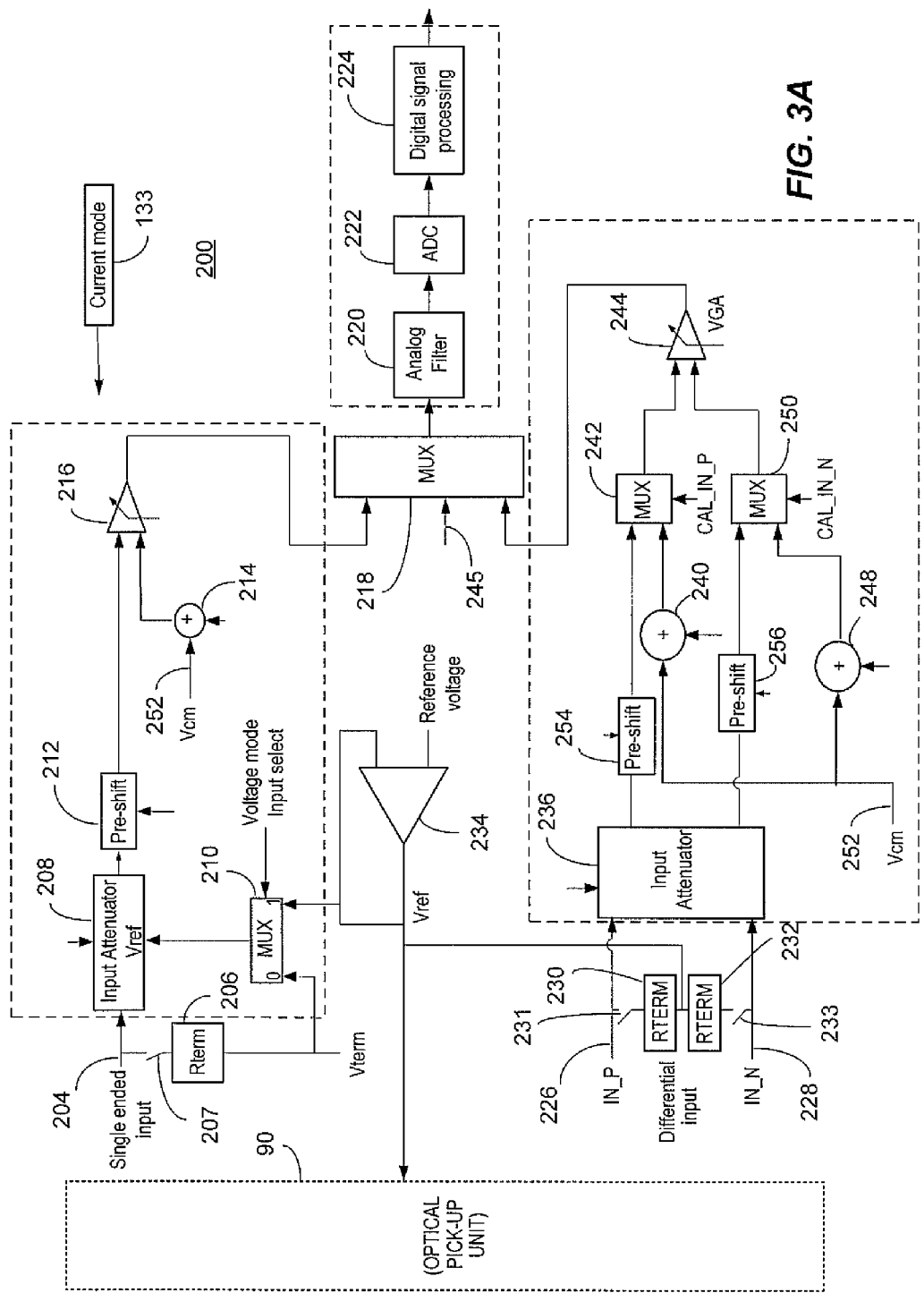
FIG. 3A is a block diagram of another embodiment of an AFE.

FIG. 3A shows an alternate embodiment of the circuit 200 of FIG. 3. FIG. 3A illustrates pre-shifter 212 may be coupled directly to variable gain block 216 with the Vcm signal 252 coupled to level shifter 214 and that the pre-shifters 254 and 256 of the differential input stage may be coupled to the respective mux inputs 242 and 250 respectively and level shifters 240 and 248 may be coupled to the Vcm signal 252 for calibration settings.

Figure 6:
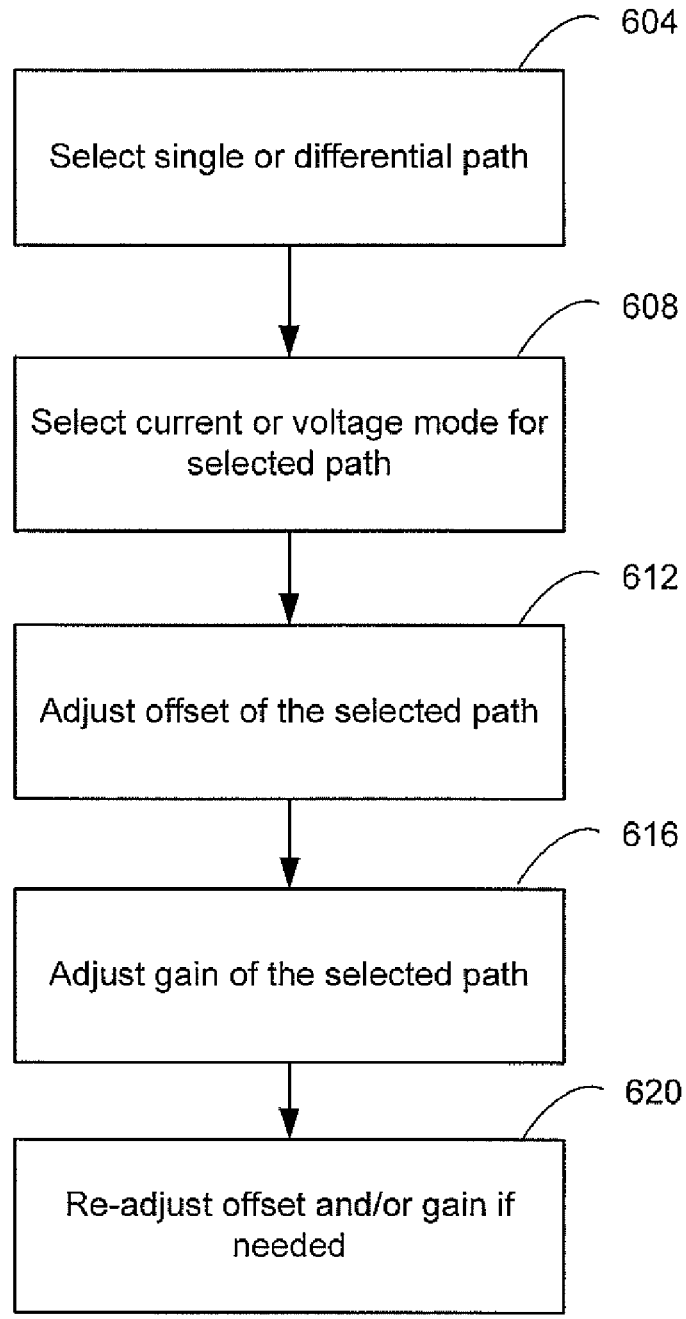
FIG. 6 is a flow diagram of a method of operating an AFE such as the AFE of FIG. 2, the AFE of FIG. 3, or the AFE of FIG. 3A.

FIG. 6 is a block diagram of an example method 600 for operating an AFE, such as the AFE of FIG. 2, the AFE of FIG. 3, or the AFE of FIG. 3A. The method 600 will be described with reference to FIGS. 2, 3, and 3A for explanatory purposes, but it is to be understood that the method 600 can be utilized with AFE's other than those of FIGS. 2, 3, and 3A.

At block 604, a single-ended input or a differential input is selected based on whether the OPU generates a single-ended or a differential output. For example, the control signal 132 (FIG. 2) or the control signal 245 (FIGS. 3, 3A) is selected to couple the single-ended path or the differential path of the AFE to the digital signal processing block 110. At block 608, a current mode or a voltage mode is selected based on whether the OPU generates current mode or voltage mode outputs. For example, the switch 120, the switches 126 and 128, the switch 207, and/or the switches 231 and 233 may be appropriately closed or opened. Also, the multiplexer 210 may be appropriately controlled.

At block 612, an offset of the selected path may be adjusted, and at block 616 a gain of the selected path may be adjusted. In particular, the offset and the gain may be adjusted so that an input to the digital signal processing block 110 is within and corresponds to a dynamic range of the digital signal processing block 110. In the AFE of FIG. 2, an offset and a gain of the signal processing block 106 and/or an offset and a gain of the signal processing block 116 could be adjusted. In the AFE's of FIGS. 3 and 3A, the pre-shifter 212 and the calibration level shifter 214 could be controlled to adjust the offset in the single-ended path. In some embodiments, the level shifter 214 is set once during calibration, while pre-shifter 212 is used to adjust levels during operation, for example, when changing from read to write. The attenuator 208 and the gain stage 216 could be controlled to adjust the gain in the single-ended path. In the AFE of FIG. 3, the pre-shifters 238 and 246 and the level shifters 240 and 248 could be controlled to adjust the DC offset in the differential path. In the AFE of FIG. 3A, the pre-shifters 254 and 256 and the level shifters 240 and 248 could be controlled to adjust the DC offset in the differential path. In the AFE's of FIGS. 3 and 3A, the attenuator 236 and the gain stage 244 could be controlled to adjust the gain in the differential path.

At block 620, the offset and/or the gain may be readjusted if needed. For example, the offset and/or the gain may be readjusted if needed as a result of a read to write transition or a write transition.

Figure 7:
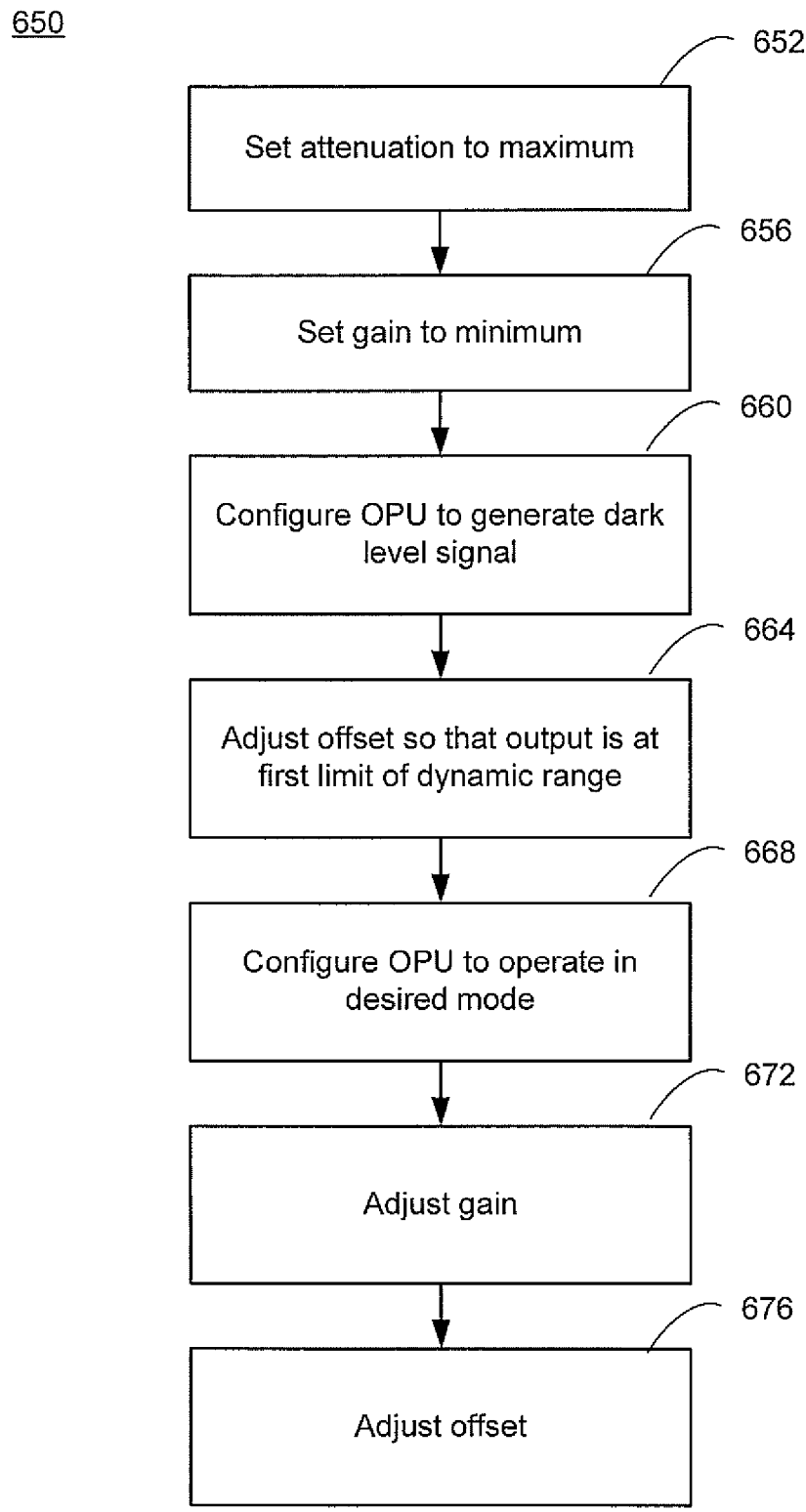
FIG. 7 is a flow diagram of a method of calibrating an AFE such as the AFE of FIG. 3 or the AFE of FIG. 3A.

FIG. 7 is a block diagram of a method for adjusting the gain and offset of an AFE, such as the AFE's of FIGS. 3 and 3A. The method 600 will be described with reference to FIGS. 2, 3, and 3A for explanatory purposes, but it is to be understood that the method 600 can be utilized with AFE's other than those of FIGS. 2, 3, and 3A.

At block 652, an attenuation in the selected signal path may be set to a maximum. In the AFE's of FIGS. 3 and 3A, for example, the input attenuator 208 and/or the input attenuator 236 could be controlled to provide a maximum attenuation. At block 656, a gain in the selected signal path may be set to a minimum. In the AFE's of FIGS. 3 and 3A, for example, the gain stage 216 and/or the gain stage 244 may be controlled to provide a minimum gain.

At block 660, the OPU may be configured to generate a signal corresponding to a dark level of the OPU. For example, a laser of the OPU could be turned off. In at least some implementations, the dark level signal may be the value Vref. At block 664, an offset of the selected path may be adjusted so that an input to the signal processing block 110 is at a first level of a dynamic range of the signal processing block 110. For example, the offset could be adjusted so that the input to the signal processing block 110 is at a lower level of the dynamic range of the signal processing block 110.

Example techniques for implementing block 664 will now be described. With regard to the single-ended path, the pre-shifter 212 first could be adjusted based on a known value of the dark level signal. Then, the level shifter 214 could be adjusted based on information from the signal processing block 110. For example, a desired lower level of the output of the ADC 222 could be Badc, and the actual lower level of the output of the ADC 222 could be Bs. Further, a gain of the gain stage 216 could be G1. Still further, a gain from the output of the gain stage 216 to the output of the ADC 222 could be known to be G. Then, the level shift that should be provided by the level shifter 214 could be calculated as $(Badc-Bs)/(G*G1)$.

With regard to the differential path, the pre-shifters 238 and 246, or the pre-shifters 254 and 256, first could be adjusted based on a known value of the dark level signal. Then, the multiplexer 242 is controlled to route the positive portion of the differential signal to the gain stage 244, and the multiplexer 250 is controlled to route the reference signal Vcm to the gain stage 244. Next, the level shifter 240 could be adjusted based on information from the signal processing block 110. For example, if the gain of the gain stage 244 is G1 the level shift that should be provided by the level shifter 240 could be calculated as $(Badc/2-Bs)/(G*G1)$.

Similarly, the multiplexer 242 then is controlled to route the reference signal Vcm to the gain stage 244, and the multiplexer 250 is controlled to route the negative portion of the differential signal to the gain stage 244. Next, the level shifter 248 could be adjusted based on information from the signal processing block 110. For example, a level shift that should be provided by the level shifter 248 could be calculated as (Badc/2−Bs)/(G*G1).

Next, the multiplexer 242 is controlled to route the positive portion of the differential signal to the gain stage 244, and the multiplexer 250 is controlled to route the negative portion of the differential signal to the gain stage 244. Then, each of the level shifters 240 and 248 could be adjusted based on information from the signal processing block 110. For example, a level shift that should be provided by each of the level shifters 240 and 248 could be calculated as (Badc−Bs)/(G*G1).

At block 668, the OPU is configured to operate in a desired mode. For example, the laser of the OPU could be turned on and the OPU put into the desired mode, such as a read mode or a write mode.

Then, at block 672, the gain could be adjusted and, at block 676, the offset could be adjusted. In particular, the gain and the offset may be adjusted so that an input to the signal processing block 110 is within and corresponds to a dynamic range of the signal processing block 110. Example techniques for implementing these blocks will be described with reference to several values: Tadc, Badc, Ts and Bs. Badc and Bs were described previously. In particular, Badc is a desired lower level of the output of the ADC 222 and Bs is an actual lower level of the output of the ADC 222. Similarly, Tadc is a desired upper level of the output of the ADC 222 and Ts is an actual upper level of the output of the ADC 222.

With regard to adjusting the gain, first the attenuation provided by the attenuator 208 or the attenuator 236 may be decremented until either the attenuation is 0 or the next decrement would result in (Tadc−Badc)<(Ts−Bs). Then, the gain of the gain stage 216 or the gain stage 244 may be set to G1*(Tadc−Badc)/(Ts−Bs). With regard to adjusting the offset, the level shifter 214 or each of the level shifters 240 and 248 may be set to provide an offset of [(Tadc+Badc)/2−(Ts+Bs)/2]/(G*G1).

Of course, other techniques may used to adjust the offset and the gain. For example, the gain stage 216 or the gain stage 244 could be incrementally adjusted until Ts−Bs was approximately equal to Tadc−Badc. Then, the level shifter 214 or each of the level shifters 240 and 248 could be incrementally adjusted until the output of the ADC 222 was centered with the desired dynamic range. As another example, the gain stage 216 or the gain stage 244 and the level shifter 214 or each of the level shifters 240 and 248 could be iteratively adjusted until the output of the ADC 222 was centered with the desired dynamic range and Ts−Bs was approximately equal to Tadc−Badc.

When calibrated in this fashion, level changes in the OPU may be accommodated by simple changes to the attenuation level. For example, because the laser power level of the OPU is known to the AFE 200 of FIGS. 3 and 3A, a proportional change in power level, for example, between read and write, is known. Because the AFE 200 is calibrated to the dark level of the OPU 90, and the power level change is known, the AFE 200 may adjust between read and write laser power levels by making a simple input attenuation change proportional to the change in laser power level. Real-time adjustments based on output changes may be avoided. This simplifies the amount of data that must be stored related to read and write calibration level as well as simplifies the circuitry needed to adjust the various settings.

In other embodiments, however, a single setting of the attenuator may not accommodate the change in laser power level. In such cases, settings for the attenuator 208 or 236, pre-shifter 212, level shifter 214 and gain 216 can be stored for each operating mode of the single-ended circuit and can be restored when a change in power level is required. Similarly for the double-ended circuit, settings may be stored for each adjustable element, including the input attenuator 236, the pre-shifters 254 and 256, the level shifters 240 and 248, and the gain block 244.

Figure 8A:
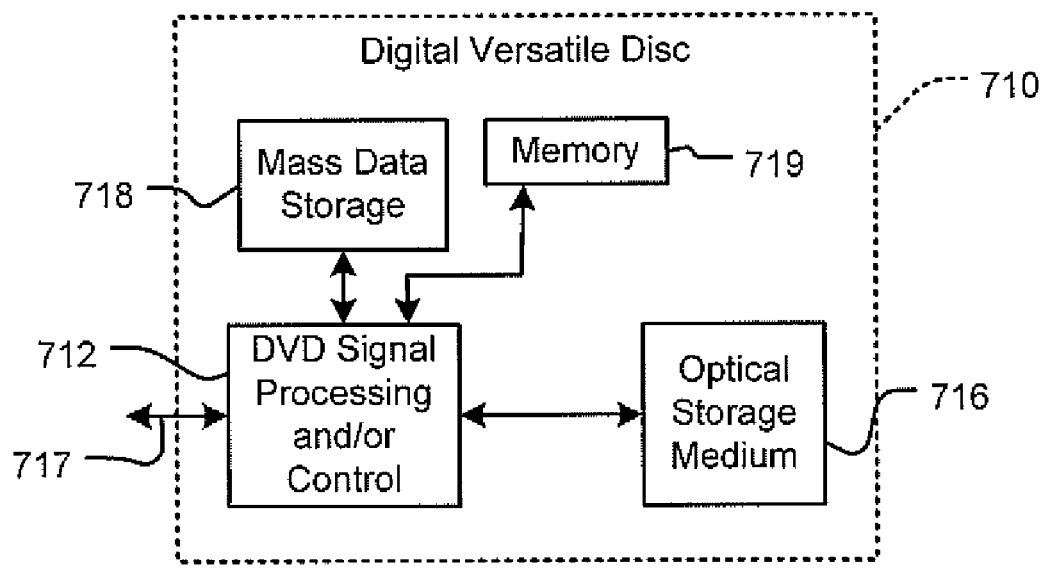
FIG. 8A is a block diagram of a digital versatile disk (DVD) drive that may utilize an AFE such as the AFE of FIG. 2, the AFE of FIG. 3, or the AFE of FIG. 3A, or that may utilize an AFE method such as the methods of FIG. 6 or FIG. 7.

Referring now to FIG. 8A, an AFE such as the AFE's of FIGS. 2, 3, and 3A, or a method such as the methods of FIGS. 6 and 7 may be utilized in a digital versatile disc (DVD) drive 710. The AFE or AFE method may be implemented by either or both signal processing and/or control circuits, which are generally identified in FIG. 8A at 712, and/or mass data storage 718 of DVD drive 710. Signal processing and/or control circuit 712 and/or other circuits (not shown) in DVD 710 may process data, perform coding and/or encryption, perform calculations, and/or format data that is read from and/or data written to an optical storage medium 716. In some implementations, signal processing and/or control circuit 712 and/or other circuits (not shown) in DVD 710 can also perform other functions such as encoding and/or decoding and/or any other signal processing functions associated with a DVD drive.

DVD drive 710 may communicate with an output device (not shown) such as a computer, television or other device via one or more wired or wireless communication links 717. DVD 710 may communicate with mass data storage 718 that stores data in a nonvolatile manner. Mass data storage 718 may include a hard disk drive (HDD). The HDD may be a mini HDD that includes one or more platters having a diameter that is smaller than approximately 1.8". DVD 710 may be connected to memory 719, such as RAM, ROM, low latency nonvolatile memory such as flash memory, and/or other suitable electronic data storage.

Figure 8B:
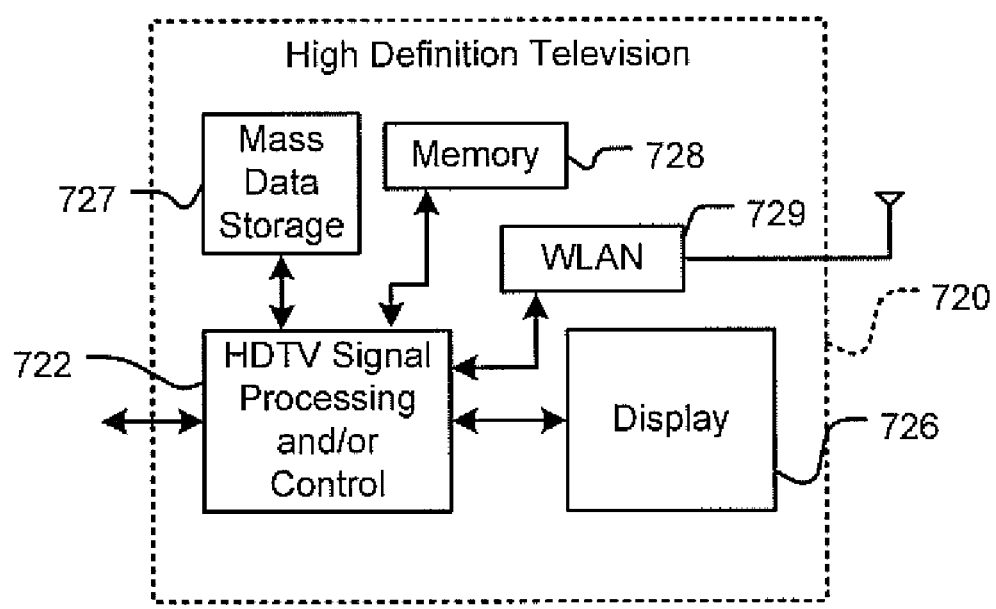
FIG. 8B is a block diagram of a high definition television that may utilize an AFE such as the AFE of FIG. 2, the AFE of FIG. 3, or the AFE of FIG. 3A, or that may utilize an AFE method such as the methods of FIG. 6 or FIG. 7.

Referring now to FIG. 8B, an AFE such as the AFE's of FIGS. 2, 3, and 3A, or a method such as the methods of FIGS. 6 and 7 may be utilized in a high definition television (HDTV) 420. The AFE or AFE method may be implemented by either or both signal processing and/or control circuits, which are generally identified in FIG. 8B at 722, a WLAN interface and/or mass data storage of the HDTV 720. HDTV 720 receives HDTV input signals in either a wired or wireless format and generates HDTV output signals for a display 726. In some implementations, signal processing circuit and/or control circuit 722 and/or other circuits (not shown) of HDTV 720 may process data, perform coding and/or encryption, perform calculations, format data and/or perform any other type of HDTV processing that may be required.

HDTV 720 may communicate with mass data storage 727 that stores data in a nonvolatile manner such as optical and/or magnetic storage devices. Mass data storage 727 may include optical and/or magnetic storage devices for example hard disk drives HDD and/or DVDs. At least one DVD may have the configuration shown in FIG. 8A. The HDD may be a mini HDD that includes one or more platters having a diameter that is smaller than approximately 1.8". HDTV 720 may be connected to memory 728 such as RAM, ROM, low latency nonvolatile memory such as flash memory and/or other suitable electronic data storage. HDTV 720 also may support connections with a WLAN via a WLAN network interface 729.

Figure 8C:
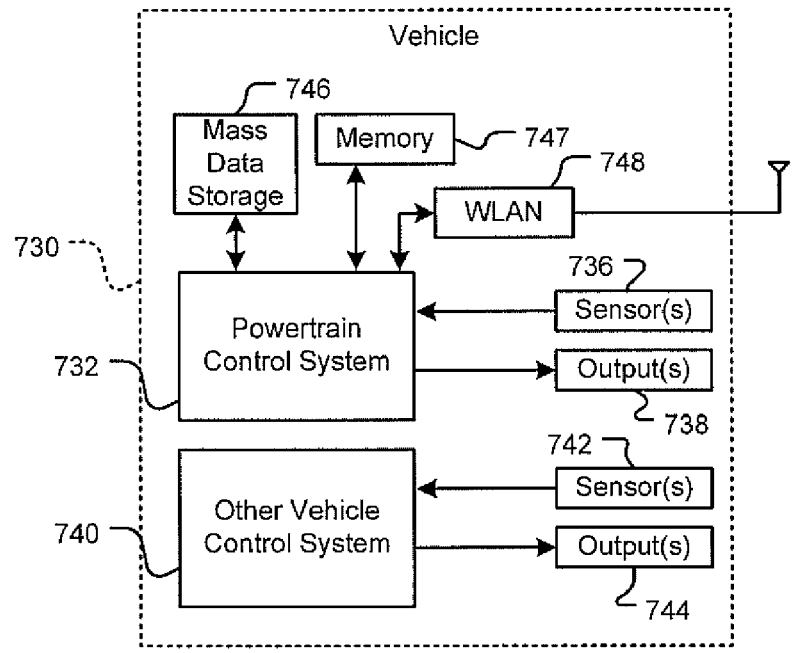
FIG. 8C is a block diagram of a vehicle that may utilize an AFE such as the AFE of FIG. 2, the AFE of FIG. 3, or the AFE of FIG. 3A, or that may utilize an AFE method such as the methods of FIG. 6 or FIG. 7.

Referring now to FIG. 8C, an AFE such as the AFE's of FIGS. 2, 3, and 3A, or a method such as the methods of FIGS. 6 and 7 may be utilized in a control system of a vehicle 730, a WLAN interface and/or mass data storage of the vehicle control system. In some implementations, the AFE or AFE method may be implemented by a powertrain control system 732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The AFE or AFE method may also be implemented in other control systems 740 of vehicle 730. Control system 740 may likewise receive signals from input sensors 742 and/or output control signals to one or more output devices 744. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 732 may communicate with mass data storage 746 that stores data in a nonvolatile manner. Mass data storage 746 may include optical and/or magnetic storage devices for example hard disk drives HDD and/or DVDs. At least one DVD may have the configuration shown in FIG. 8A. The HDD may be a mini HDD that includes one or more platters having a diameter that is smaller than approximately 1.8". Powertrain control system 732 may be connected to memory 747 such as RAM, ROM, low latency nonvolatile memory such as flash memory and/or other suitable electronic data storage. Powertrain control system 732 also may support connections with a WLAN via a WLAN network interface 748. The control system 740 may also include mass data storage, memory and/or a WLAN interface (all not shown).

Figure 8D:
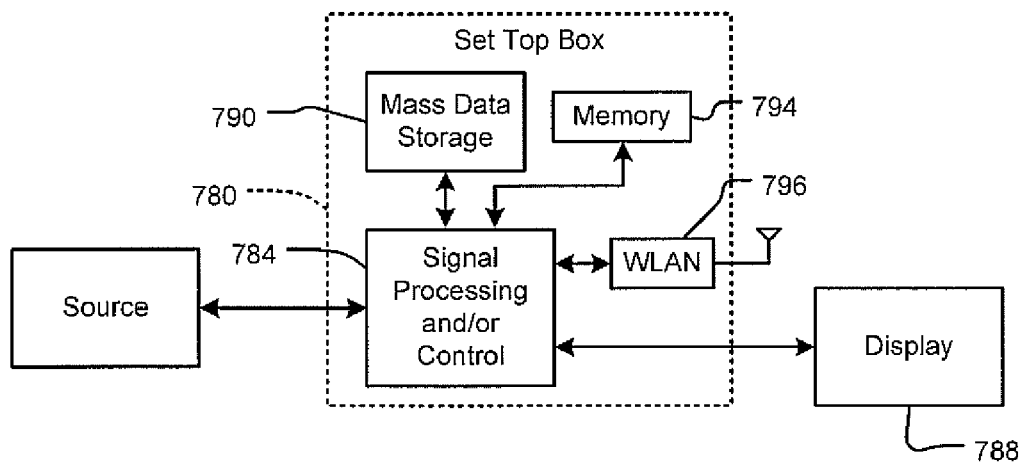
FIG. 8D is a block diagram of a television set top box that may utilize an AFE such as the AFE of FIG. 2, the AFE of FIG. 3, or the AFE of FIG. 3A, or that may utilize an AFE method such as the methods of FIG. 6 or FIG. 7.

Referring now to FIG. 8D, an AFE such as the AFE's of FIGS. 2, 3, and 3A, or a method such as the methods of FIGS. 6 and 7 may be utilized in a set top box 780. The AFE or AFE method may be implemented by either or both signal processing and/or control circuits, which are generally identified in FIG. 8D at 784, a WLAN interface and/or mass data storage of the set top box 780. Set top box 780 receives signals from a source such as a broadband source and outputs standard and/or high definition audio/video signals suitable for a display 788 such as a television and/or monitor and/or other video and/or audio output devices. Signal processing and/or control circuits 784 and/or other circuits (not shown) of the set top box 780 may process data, perform coding and/or encryption, perform calculations, format data and/or perform any other set top box function.

Set top box 780 may communicate with mass data storage 790 that stores data in a nonvolatile manner. Mass data storage 790 may include optical and/or magnetic storage devices for example hard disk drives HDD and/or DVDs. At least one DVD may have the configuration shown in FIG. 8A. The HDD may be a mini HDD that includes one or more platters having a diameter that is smaller than approximately 1.8". Set top box 780 may be connected to memory 794 such as RAM, ROM, low latency nonvolatile memory such as flash memory and/or other suitable electronic data storage. Set top box 780 also may support connections with a WLAN via a WLAN network interface 796.

Figure 8E:
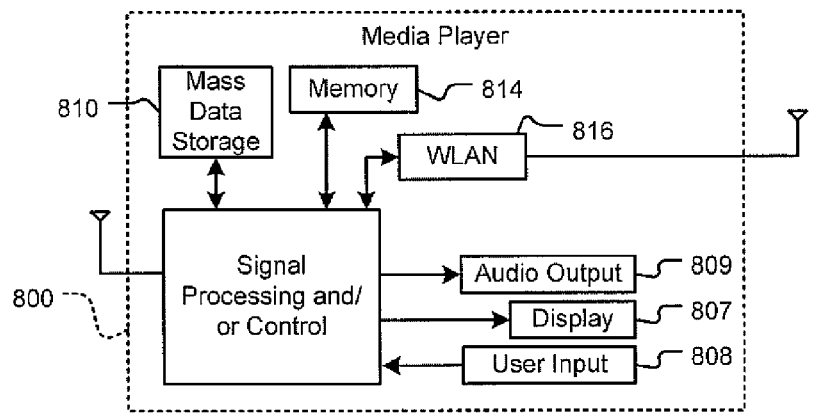
FIG. 8E is a block diagram of a media player that may utilize an AFE such as the AFE of FIG. 2, the AFE of FIG. 3, or the AFE of FIG. 3A, or that may utilize an AFE method such as the methods of FIG. 6 or FIG. 7.

Referring now to FIG. 8E, an AFE such as the AFE's of FIGS. 2, 3, and 3A, or a method such as the methods of FIGS. 6 and 7 may be utilized in a media player 800. The AFE or AFE method may be implemented by either or both signal processing and/or control circuits, which are generally identified in FIG. 8E at 804, a WLAN interface and/or mass data storage of the media player 800. In some implementations, media player 800 includes a display 807 and/or a user input 808 such as a keypad, touchpad and the like. In some implementations, media player 800 may employ a graphical user interface (GUI) that typically employs menus, drop down menus, icons and/or a point-and-click interface via display 807 and/or user input 808. Media player 800 further includes an audio output 809 such as a speaker and/or audio output jack. Signal processing and/or control circuits 804 and/or other circuits (not shown) of media player 800 may process data, perform coding and/or encryption, perform calculations, format data and/or perform any other media player function.

Media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one DVD may have the configuration shown in FIG. 8A. The HDD may be a mini HDD that includes one or more platters having a diameter that is smaller than approximately 1.8". Media player 800 may be connected to memory 814 such as RAM, ROM, low latency nonvolatile memory such as flash memory and/or other suitable electronic data storage. Media player 800 also may support connections with a WLAN via a WLAN network interface 816. Still other implementations in addition to those described above are contemplated.

Figure 8F:
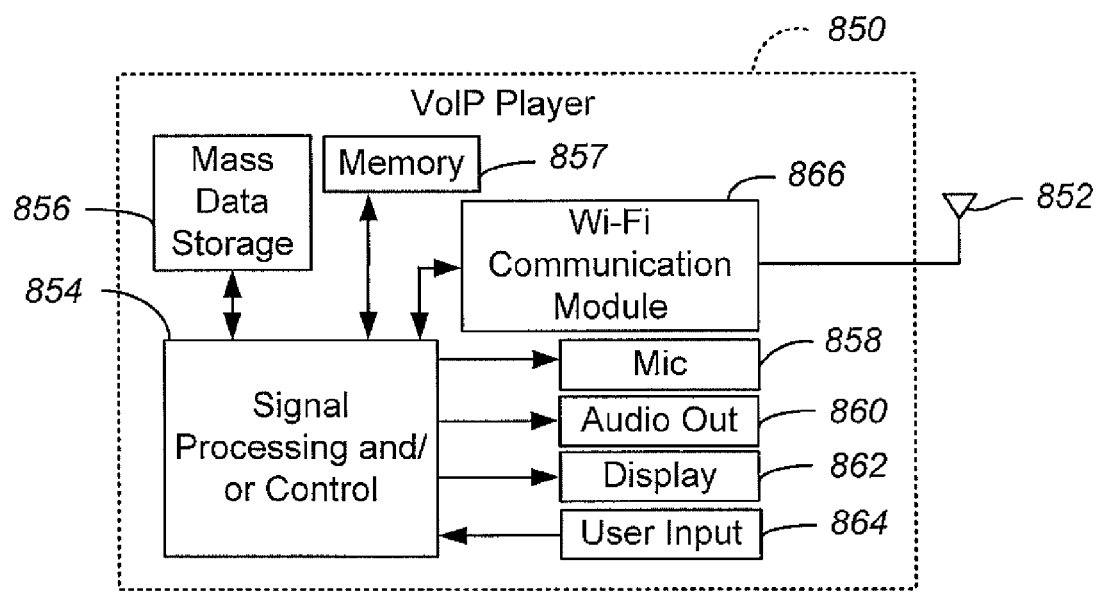
FIG. 8F is a block diagram of a voice over Internet Protocol (VoIP) telephone that may utilize an AFE such as the AFE of FIG. 2, the AFE of FIG. 3, or the AFE of FIG. 3A, or that may utilize an AFE method such as the methods of FIG. 6 or FIG. 7.

Referring to FIG. 5F, an AFE such as the AFE's of FIGS. 2, 3, and 3A, or a method such as the methods of FIGS. 6 and 7 may be utilized in a Voice over Internet Protocol (VoIP) phone 850 that may include an antenna 852. The AFE or AFE method may be implemented by either or both signal processing and/or control circuits, which are generally identified in FIG. 8F at 854. The VoIP phone 850 may include a mass data storage 856 and memory 857. In some implementations, VoIP phone 850 includes, in part, a microphone 858, an audio output 860 such as a speaker and/or audio output jack, a display monitor 862, an input device 864 such as a keypad, pointing device, voice actuation and/or other input devices, and a Wireless Fidelity (Wi-Fi) communication module 866. Signal processing and/or control circuits 854 and/or other circuits (not shown) in VoIP phone 850 may process data, perform coding and/or encryption, perform calculations, format data and/or perform other VoIP phone functions.

VoIP phone 850 may communicate with mass data storage 856 that stores data in a nonvolatile manner such as optical and/or magnetic storage devices, for example hard disk drives HDD and/or DVDs. At least one DVD may have the configuration shown in FIG. 8A. The HDD may be a mini HDD that includes one or more platters having a diameter that is smaller than approximately 1.8". VoIP phone 850 may be connected to memory 857, which may be a RAM, ROM, low latency nonvolatile memory such as flash memory and/or other suitable electronic data storage. VoIP phone 850 is configured to establish communications link with a VoIP network (not shown) via Wi-Fi communication module 866.

We claim:

1. An apparatus for conditioning a signal from an optical pickup unit (OPU), the apparatus comprising:
   a single-ended channel including a first signal processing block to calibrate a dark level of a single-ended signal corresponding to a single-ended output of the OPU, if any, and to center the single-ended signal;
   a dual-ended channel including a second signal processing block to calibrate a dark level of a dual-ended signal corresponding to a dual-ended output of the OPU, if any, and to center the dual-ended signal;

a multiplexer to select one of the single-ended channel and the dual-ended channel and to output a selected signal; and a digital signal processing stage to convert the selected signal to a digital signal.

2. The apparatus of claim 1, further comprising:
a voltage source coupled to the OPU to provide a dark level reference voltage to the OPU.

3. The apparatus of claim 1, wherein the first signal processing block includes a pre-shifter to adjust a DC level of the single-ended signal.

4. The apparatus of claim 1, wherein the second signal processing block includes a separate pre-shifter for each component of the dual-ended signal, each pre-shifter adjusting a DC level of the respective component.

5. The apparatus of claim 1, wherein the first signal processing block is direct current coupled to the OPU.

6. The apparatus of claim 1, wherein the second signal processing block is direct current coupled to the OPU.

7. The apparatus of claim 1, wherein the first signal processing block comprises a single-ended variable attenuator and a single-ended variable level shifter.

8. The apparatus of claim 7, wherein the second signal processing block further comprises a dual-ended variable attenuator, a positive signal variable level shifter, and a negative signal variable level shifter.

9. The apparatus of claim 8, wherein the singled-ended variable attenuator and the dual-ended variable attenuator are configured to set an amplitude of the signal by changing their respective attenuation factors proportional to a power level of a laser in the OPU.

10. The apparatus of claim 1, wherein the digital signal processing stage comprises:
an analog-to-digital converter;
an analog filter having an input coupled to the output of the multiplexer and an output coupled to an input of the analog-to-digital converter; and
a digital signal processor having an input coupled to an output of the analog-to-digital converter.

11. The apparatus of claim 1, wherein the first signal processing block is configured to adjust an offset of the single-ended signal while the OPU generates an output corresponding to the dark level;
wherein the second signal processing block is configured to adjust an offset of the dual-ended signal while the OPU generates the output corresponding to the dark level.

12. The apparatus of claim 1, wherein the first signal processing block is configured to center the single-ended signal by adjusting a DC offset of the single-ended signal;
wherein the second signal processing block is configured to center the dual-ended signal by adjusting DC offsets of components of the dual-ended signal.

13. The apparatus of claim 12, wherein the first signal processing block is configured to center the single-ended signal further by changing an attenuation factor of the single-ended channel in proportion to a power level of a laser in the OPU;
wherein the second signal processing block is configured to center the dual-ended signal further by changing an attenuation factor of the dual-ended channel in proportion to the power level of the laser in the OPU.

14. A method of processing a data signal from an optical pickup unit (OPU) using a signal conditioning unit comprising a single-ended channel and a dual-ended channel, the method comprising:
selecting one of the single-ended channel and the dual-ended channel as an active channel;
calibrating a dark level of the active channel;
centering the data signal in the active channel within a dynamic range of a digital signal processing stage; and
converting the data signal of the active channel to a digital signal at the digital signal processing stage.

15. The method of claim 14, wherein calibrating the dark level comprises causing the OPU to generate an output corresponding to the dark level.

16. The method of claim 15, wherein calibrating the dark level further comprises adjusting an offset of the data signal while the OPU generates the output corresponding to the dark level.

17. The method of claim 14, wherein centering the data signal comprises:
adjusting a voltage source to provide a DC offset to the data signal.

18. The method of claim 14, wherein centering the data signal further comprises setting an amplitude of the data signal by changing an attenuation factor of the active channel in proportion to a power level of a laser in the OPU.

19. The method of claim 18, wherein setting the amplitude comprises setting the attenuation factor to a maximum and decreasing the attenuation factor until another incremental decrease of the attenuation factor causes a signal envelope of the data signal to exceed the dynamic range of the digital signal processing stage.

20. The method of claim 14, wherein centering the data signal comprises:
adjusting a DC offset; and
adjusting a gain.

* * * * *